2,806,861

PURIFICATION OF MALEIC ANHYDRIDE

Howard David Cummings, St. Louis, Mo., assignor to Monsanto Chemical Company, St. Louis, Mo., a corporation of Delaware No Drawing. Application July 28, 1955,
Serial No. 525,059

8 Claims. (Cl. 260—346.8)

This invention relates to the purification of maleic anhydride and more specifically pertains to a method for refining maleic anhydride produced by catalytic vapor-phase oxidation and containing chromogenic bodies.

Maleic anhydride is produced by the vapor-phase oxidation of organic compounds such as for example benzene, toluene, naphthalene, methyl naphthalene, phenol, cresol, benzophenone, furan, biphenyl, furfural, n-butane, 1-butene, 2-butene, butadiene, heptane, isooctane, crotonaldehyde and crotonic acid among others with a high ratio of air to the organic compound. Maleic anhydride together with other organic acids, chromogenic bodies and compounds produced such as carbon dioxide and water appear in the gases coming from the vapor-phase oxidation reactor. In some oxidation processes, maleic anhydride is produced as a by-product of the reaction such as for example in the oxidation of naphthalene where the main dicarboxylic acid anhydride produced is phthalic anhydride. In this process, the phthalic anhydride is condensed out of the mixture of gases before the maleic anhydride is recovered. In many cases, the maleic anhydride content of the gaseous mixture obtained from the vapor-phase oxidation process contains a relatively small amount of maleic anhydride being at the most in the range of from 0.1 to 1.0 mole percent.

Numerous processes have been suggested for the recovery of maleic anhydride from such lean vaporous mixtures. For example, it has been proposed that vaporous mixtures be subjected to preliminary cooling to obtain a partial condensation of maleic anhydride therefrom followed by further treatment of the remaining vaporous mixture to effect a more complete removal of maleic anhydride from these remaining vapors. It has also been proposed to conduct a vaporous mixture through a solvent to absorb maleic anhydride and other absorbable products from the gaseous and vaporous mixture and then recovering the maleic anhydride from the resulting solvent solution. In addition, it has been proposed to conduct the vaporous mixtures into water to form an aqueous solution of maleic acid and other water-soluble materials from which maleic acid must be recovered and then dehydrated to maleic anhydride. Maleic anhydride products condensed by some methods is exceedingly dark in color, while that recovered by other methods is not as dark, but a common property of all maleic anhydride products recovered from a vaporous mixture obtained from the vapor-phase oxidation processes is the presence of colored and/or color-forming impurities herein referred to as chromogenic bodies.

Among the first attempts to obtain a maleic anhydride free from chromogenic bodies was distillation or fractionation of crude maleic anhydride, that is, maleic anhydride containing chromogenic bodies. With such a distillation process a vastly improved light colored maleic anhydride product was obtained, but this product was definitely not white. At most it varied from a light yellow to light gray to a yellow or gray product.

It was later proposed to "heat age" crude maleic anhydride by a process which consisted mainly in heating crude maleic anhydride at or slightly above its boiling point at atmospheric pressure under reflux conditions for a period of time of from 2 to 10 or more hours. Temperatures below the boiling point of maleic anhydride, that is below 200° C., and as low as about 130° C. were said to be of some value in the refining of maleic anhydride. However, these low temperatures required a heat-aging process of as long as 10 days. The heat-aged maleic anhydride while molten was charged to distillation equipment and then fractionated at reduced pressure. The maleic anhydride product refined by this process was of an improved quality over that obtained by the fractionation process.

Another process for refining crude maleic anhydride comprises heating molten crude maleic anhydride under slightly reduced pressure to "strip off" low boiling material and completely dry the crude maleic anhydride, thereafter the crude maleic anhydride is heated under reflux conditions for varying periods of time either alone or with such "cooking agents" as sulfuric acid; the oxy acids of phosphorus, arsenic or antimony; nitrates, among others. Maleic anhydride thus treated is charged to distillation equipment while molten and then subjected to fractionation preferably at reduced pressure.

It has now been discovered that a highly refined maleic anhydride product can be easily and readily obtained by cooking a crude maleic anhydride in the presence of a small amount of manganese dioxide for a short period of time and then recovering the maleic anhydride by fractionation preferably at reduced pressure. By this process, there is no forerun of colored anhydride product which must be recycled to a subsequent refining process as is obtained in many of the maleic anhydride purifying processes heretofore employed. Rather, a maleic anhydride product of extremely light color and high purity can be obtained preferably by fractionation at reduced pressure, within a very narrow temperature range leaving behind only a small amount of residue. By this new process as much as 95% of the maleic anhydride in the crude maleic anhydride charge to the refining process can be recovered having a boiling point of from 113° to 114° C. at 50 mm. Hg absolute, and being of such high purity that it has a color corresponding to an A. P. H. A. No. of 5 on the Hazen Scale.

In general, the process of this invention comprises heating molten crude maleic anhydride with at least about 0.1% by weight of $MnO_2$ at atmospheric pressure. While the use of large amounts of manganese dioxide do not, in general, produce deleterious effects, it has been found that the use of more than 2% by weight of manganese dioxide based on the crude maleic anhydride, does not improve the efficiency of the process. Hence, the beneficial effects of the process of this invention can be accomplished by employing 0.1% to 2% by weight of manganese dioxide based on the crude maleic anhydride. However, for the more efficient operation of the process of this invention, the use of from 0.2% to about 1.0% will be found to be entirely satisfactory and thus is the preferred range of concentration of manganese dioxide. Also, satisfactory results will be obtained in a short time by maintaining the crude maleic anhydride at or near its boiling point while in contact with the manganese dioxide. Thus, a preferred embodiment of the present invention comprises heating crude maleic anhydride containing from 0.2% to about 1% by weight of manganese dioxide under reflux conditions. However, satisfactory results can be obtained by heating the crude maleic anhydride with manganese dioxide at temperatures below the boiling point of the mixture, temperatures of from 130° to 200° C., but equivalent results at these temperatures will require longer periods of time. Also, temperatures above about 200° C., say up to 250° to 300° C., can be employed if desired together with superatmospheric pressure.

The process of this invention includes the improved cooking or heat-aging steps of melting a mixture of crude maleic anhydride and heating this melt in admixture with manganese dioxide preferably at or about the boiling point of the mixture. This heat-aging or cooking step need not be carried out at atmospheric pressure, but can be carried out by heating the mixture of maleic anhydride and manganese dioxide to its boiling point at reduced pressure or at super-atmospheric pressure. However, since either of these modifications may require the use of additional special equipment, the heating of the mixture at atmospheric pressure would be preferred to avoid the additional cost of such specialized equipment. A still further modification of the process of this invention includes the steps of heating the crude maleic anhydride to remove by distillation low boiling impurities; preferably this is accomplished at reduced pressure of from about 50 mm. Hg to about 100 mm. Hg. The resulting partially purified crude maleic anhydride is heated in the presence of a small amount of manganese dioxide admixed therewith at or about the boiling point of the resulting mixture and thereafter purified maleic anhydride is recovered therefrom by fractionation. A still further embodiment of the process of this invention comprises carrying out the fractionation step at a reduced pressure of from 20 to 200 mm. Hg. By employing the preferred conditions of the process of this invention, maleic anhydride of exceptional purity and color stability can be recovered from the refining process by fractional distillation after heating the crude maleic anhydride for two to five hours.

It will, of course, be appreciated by those skilled in the art that maleic anhydride products which have been subjected to purifying conditions in connection with the recovery of said maleic anhydride and which contain very little chromogenic bodies, can be used in the process of this invention, and will be converted to substantially pure maleic anhydride after being heated at reflux in contact with manganese dioxide for ten minutes or less, but such maleic anhydride will constitute at most only a very small percentage of the maleic anhydride encountered in industrial practices. Most of the crude maleic anhydride to be encountered in industrial purifying or refining processes will be that obtained from the converter gases, as hereinbefore described, and will vary in color from a light yellow to very dark brown.

The process of this invention will be illustrated by the following specific examples in which the term "parts" is used to indicate parts by weight. It is not desired or intended that the practice of this invention be limited to the specific conditions of these examples.

*Example I*

There is charged into a suitable vessel fitted with a reflux condenser 1000 parts of a crude maleic anhydride which had previously been heated under reflux conditions for 45 minutes and recovered by distillation at 50 mm. Hg. This crude maleic anhydride is heated to the boiling point with 1% by weight of manganese dioxide and permitted to reflux at the boiling point of the mixture, about 205° C., for about 3 hours. The resulting molten mixture is charged to a fractionation unit and subjected to fractionation at 50 mm. Hg. The first 76 parts which were recovered were held separately in a container and will be referred to as fraction 1. The next 860 parts recovered by fractionation were also collected separately and will be referred to as fraction 2. The next 34 parts recovered by fractionation will be referred to as fraction 3.

The color of samples of each of fractions 1 and 3 were determined by comparison with the A. P. H. A. number on the Hazen Scale by comparing the color of a melt of the sample against the Hazen Scale. The colors of a mixture of fraction 1 and 2 and a mixture of fractions 1, 2 and 3 were also determined in the same way. Fraction 2 had a color corresponding to an A. P. H. A. number of less than 5, while the mixture of fractions 1 and 2 had a color corresponding to an A. P. H. A. number of about 5, and the mixture of fractions 1, 2 and 3 had a color corresponding to an A. P. H. A. number of about 5.

In contrast to the above, the color of the main fraction of the starting material corresponded to an A. P. H. A. number of about 50 while the composite had a color corresponding to an A. P. H. A. number of about 100. For further comparison maleic anhydride heretofore available had a color varying from that corresponding to an A. P. H. A. number of about 50 to about 100.

The highly refined maleic anhydride recovered from the process of this invention as described above amounted to about 98%.

*Example II*

The process of Example I is repeated except that the crude maleic anhydride employed was obtained by direct condensation from the vaporous mixture from a vapor-phase oxidation process. The sample was heated under reflux conditions with 0.3% by weight of manganese dioxide for 5 hours. Again the cooked malic anhydride was subjected to fractionation and three fractions were collected under the same conditions as in Example I. The color of the molten mixture of fractions 1, 2 and 3 was equal to an A. P. H. A. number of about 5 on the Hazen Scale, and these three fractions represented about 98% of the material charged to the purification process of this invention.

Manganese dioxide has been suggested for the use in the purification of phthalic anhydride to remove impurities from crude phthalic anhydride; however, the suggested use with crude phthalic anhydride was to contact the vapors from crude phthalic anhydride with manganese dioxide, such for example by passing the vapors through a plug of manganese dioxide during distillation or by contacting the vapors of phthalic anhydride with manganese dioxide in a packed fractionating column. When both of these methods were tried with crude maleic anhydride, a very dark colored product was obtained. For example, maleic anhydride was processed by contacting the vapors from crude maleic anhydride with a manganese dioxide plug as the vapors pass to a condenser, charging the condensed maleic anhydride to a fractionating column, and fractionating the maleic anhydride thus obtained. The combined fractionated maleic anhydride had an A. P. H. A. number of about 300 while the main fraction of the maleic anhydride recovered by fractionation (that corresponding to fraction 2 hereinbefore described) was a yellow corresponding to an A. P. H. A. number of about 100. Crude maleic anhydride purified by fractionation employing a column packed with manganese dioxide was about the same, that is, the main fraction had a color corresponding to an A. P. H. A. number of about 100, and was noticeably yellow in color. Also, a sample of the same crude maleic anhydride subjected to boiling under reflux conditions at atmospheric pressure for about an hour and then fractionated, produced a main fraction having a color corresponding to an A. P. H. A. number of about 50. On the same basis, the main fraction obtained by the process of this invention by cooking the maleic anhydride with a small amount of manganese dioxide present and then subjecting the cooked maleic anhydride to fractionation, produces a main fraction having a color corresponding to an A. P. H. A. number of 5 or less.

Example III

In contrast to the results obtained in Example II, the process of Example II is repeated using another portion of crude maleic anhydride obtained by direct condensation from the vaporous mixture from the same vapor-phase oxidation process, but no manganese dioxide was used. The only prior treatment of this maleic anhydride was the stripping therefrom of moisture and low boiling materials at 50 mm. Hg. A portion of this crude maleic anhydride was heated at its boiling point under reflux conditions for 8 hours and then transferred to fractionating equipment where three fractions were obtained as before. The color of fraction 2 was equal to an A. P. H. A. No. of about 150, while that of the combined fractions was equal to an A. P. H. A. No. of about 300.

Example IV

The process of Example I is repeated except that the maleic anhydride and manganese dioxide mixture was heated at 130° C. for ten hours, the resulting molten mixture is charged to a fractionating unit and fractionated as before at 50 mm. Hg, the maleic anhydride so treated was comparable to that obtained in Example I.

Example V

The process of Example I is repeated except that the crude maleic anhydride employed was obtained by direct condensation from the vaporous mixture from a vapor-phase oxidation process, and the amount of manganese dioxide employed is 0.6% by weight based on the maleic anhydride. The resulting mixture is heated at 190° C. for six hours and then subjected to fractionation at 50 mm. Hg. The combined weight of the first three fractions as obtained in Example I is equal to about 97% of the total crude maleic anhydride charged to the purification process. The color of the combined three fractions is equal to an A. P. H. A. No. of about 5 on the Hazen Scale.

Example VI

The process of Example II is repeated except that 0.2% by weight of manganese dioxide is employed and the resulting mixture of crude maleic anhydride and manganese dioxide is heated to 220° C. under super-atmospheric pressure for about 4 hours and then fractionated at 50 mm. Hg. The first three fractions obtained as described in Example I represented about 98% of the crude maleic anhydride charged to the purification step. The color of the composite of these three fractions was equal to that of the product obtained by the process of Example II.

To those skilled in the art, many obvious deviations from the precise process illustrated in the specific examples will be apparent. Also to those skilled in the art, the precise quantities of the material employed as well as the precise manipulative steps described in the specific examples will suggest obvious suitable changes and deviations therefrom. It is for this reason, therefore, that it is to be understood that the above description is given by way of illustration only and not by limitation, and that deviations are possible within the spirit of this invention.

What is claimed is:
1. In a process for purifying maleic anhydride, the step comprising heating maleic anhydride in the presence of at least 0.1% by weight of manganese dioxide and recovering the purified maleic anhydride.
2. In a process for purifying maleic anhydride, the step comprising heating a mixture of maleic anhydride and at least 0.1% by weight manganese dioxide at a temperature above about 130° C. and recovering the purified maleic anhydride.
3. In a process for purifying maleic anhydride, the steps comprising heating a mixture of maleic anhydride and at least 0.1% by weight manganese dioxide at its boiling point and recovering the maleic anhydride therefrom by fractionation.
4. In a process for purifying maleic anhydride, the steps comprising heating a mixture of maleic anhydride and at least 0.1% by weight manganese dioxide at its boiling point and recovering the maleic anhydride therefrom by fractionation at reduced pressure.
5. In a process for purifying maleic anhydride, the steps comprising heating a mixture of maleic anhydride and at least 0.1% by weight manganese dioxide at its boiling point and recovering the maleic anhydride therefrom by fractionation at reduced pressure of below about 100 mm. Hg.
6. In a process for purifying crude maleic anhydride, the steps comprising heating the crude maleic anhydride at reduced pressure to distill therefrom low boiling impurities, heating this maleic anhydride in admixture with at least 0.1% by weight of manganese dioxide at the boiling point of this mixture and recovering purified maleic anhydride by fractionating the resulting crude maleic anhydride composition.
7. In a process for purifying crude maleic anhydride, the steps comprising heating the crude maleic anhydride at a reduced pressure to distill therefrom low boiling impurities, heating this maleic anhydride in admixture with from 0.1% to 2% by weight of manganese dioxide at the boiling point of this mixture and recovering purified maleic anhydride by fractionating the resulting crude maleic anhydride composition.
8. In a process for purifying crude maleic anhydride, the steps comprising heating the crude maleic anhydride to distill therefrom low boiling impurities, heating this maleic anhydride in admixture with at least 0.1% by weight of manganese dioxide at the boiling point of this mixture and recovering purified maleic anhydride by fractionating the resulting crude maleic anhydride composition.

References Cited in the file of this patent

UNITED STATES PATENTS

| | | |
|---|---|---|
| 2,134,531 | Punnett | Oct. 25, 1938 |
| 2,296,218 | Middleton | Sept. 15, 1942 |
| 2,308,588 | Crowell | Jan. 19, 1943 |
| 2,309,167 | Cooper | Jan. 26, 1943 |
| 2,343,536 | Crowell | Mar. 7, 1944 |
| 2,734,854 | Ospenson | Feb. 14, 1956 |